US009187615B2

(12) United States Patent
Odagiri et al.

(10) Patent No.: US 9,187,615 B2
(45) Date of Patent: Nov. 17, 2015

(54) VINYL CHLORIDE RESIN COMPOSITION

(75) Inventors: Keiichi Odagiri, Saitama (JP); Tadashi Sengoku, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 81 days.

(21) Appl. No.: 13/817,663

(22) PCT Filed: Jul. 29, 2011

(86) PCT No.: PCT/JP2011/067412
§ 371 (c)(1),
(2), (4) Date: Feb. 19, 2013

(87) PCT Pub. No.: WO2012/023408
PCT Pub. Date: Feb. 23, 2012

(65) Prior Publication Data
US 2013/0150513 A1    Jun. 13, 2013

(30) Foreign Application Priority Data
Aug. 20, 2010 (JP) ................................. 2010-185583

(51) Int. Cl.
C08K 3/26 (2006.01)
C08L 27/06 (2006.01)
C08L 33/08 (2006.01)
C08L 33/10 (2006.01)
C08K 5/098 (2006.01)

(52) U.S. Cl.
CPC . *C08K 3/26* (2013.01); *C08L 27/06* (2013.01); *C08L 33/08* (2013.01); *C08L 33/10* (2013.01); *C01P 2002/22* (2013.01); *C08K 5/098* (2013.01); *C08L 2205/06* (2013.01)

(58) Field of Classification Search
None
See application file for complete search history.

(56) References Cited

U.S. PATENT DOCUMENTS

| 4,800,214 A * | 1/1989 | Waki et al. ............. 521/84.1 |
| 5,352,723 A * | 10/1994 | Tanno et al. ............. 524/399 |
| 5,696,226 A | 12/1997 | Nosu et al. |
| 6,348,512 B1 * | 2/2002 | Adriani ............. 521/85 |
| 6,730,741 B1 * | 5/2004 | Honda et al. ............. 525/228 |
| 2004/0229987 A1 * | 11/2004 | Kobayashi et al. ............. 524/424 |
| 2011/0201741 A1 | 8/2011 | Odagiri et al. |

FOREIGN PATENT DOCUMENTS

| CN | 1357025 A | 7/2002 |
| EP | 2 471 862 A1 | 7/2012 |
| EP | 2 540 772 A1 | 1/2013 |
| JP | 6-100749 A | 4/1994 |
| JP | 09067492 A * | 3/1997 |
| JP | 11-323048 A | 11/1999 |
| JP | 2001261907 A * | 9/2001 |
| JP | 2004-51659 A | 2/2004 |
| JP | 2009-132757 | 6/2009 |
| JP | 2009-132758 | 6/2009 |
| WO | 8-176344 A | 7/1996 |
| WO | WO 2010/041378 A1 | 4/2010 |

OTHER PUBLICATIONS

JP 2001-261907 A, Sep. 2001, Machine translation.*
JP 09067492 A, Mar. 1997, DERWENT Ab.*
International Search Report issued in PCT/JP2011/067412, dated Sep. 13, 2011.
Chinese Office Action issued in Chinese Patent Application No. 201180039760. on Aug. 18, 2014, (with partial translation).
Extended European Search Report issued in International Application No. PCT/JP2011/067412 on Oct. 7, 2014.

* cited by examiner

*Primary Examiner* — Satya Sastri
(74) *Attorney, Agent, or Firm* — Birch, Stewart, Kolasch & Birch, LLP

(57) ABSTRACT

The present invention provides a vinyl chloride resin composition having an improved resistance to warm-water bleaching. The vinyl chloride resin composition according to the present invention is characterized by comprising, with respect to 100 parts by mass of a vinyl chloride-based resin, 0.01 to 10 parts by mass of (a) a zinc-modified hydrotalcite and 0.01 to 10 parts by mass of (b) an acrylic processing aid having a weight-average molecular weight of 200,000 to 7,000,000. The above-described (a) zinc-modified hydrotalcite is preferably a compound represented by the following Formula (I):

$$Mg_{x1}Zn_{x2}Al_2(OH)_{2(x1+x2)+4} \cdot CO_3 \cdot mH_2O \qquad (I)$$

(wherein, x1 and x2 each represent a number satisfying the conditions of the following equations; and m represents a real number: $0.1 \leq x2/x1 < 10$, $2 \leq x1+x2 < 20$).

3 Claims, No Drawings

VINYL CHLORIDE RESIN COMPOSITION

TECHNICAL FIELD

The present invention relates to a vinyl chloride resin composition. More particularly, the present invention relates to a vinyl chloride resin composition having excellent resistance to warm-water bleaching.

BACKGROUND ART

Chlorine-containing resins such as vinyl chloride resins have excellent flame retardancy and chemical resistance; therefore, they are used in a variety of applications. However, chlorine-containing resins have a drawback in that they are thermally degraded to cause dehydrochlorination which leads to a reduction in the mechanical strength and occurrence of coloration as well as deterioration of the marketability.

In order to solve the above-described drawback, a variety of stabilizers have been developed and, in particular, for example, a mixture of a lead or cadmium compound and a barium compound is known to have superior stabilizing effect. However, in recent years, from the safety standpoint, the trend is toward restricting the use of lead compounds and cadmium compounds, so that stabilization by a lead or cadmium compound is now being replaced by stabilization provided by combinatory use of a highly safe zinc compound and an organic acid salt of alkaline earth metal or an inorganic compound such as hydrotalcite or zeolite. For example, in Patent Document 1, it is disclosed that magnesium hydroxide and a zinc hydrotalcite compound are combined to provide a rigid to semi-rigid chlorine-containing polymer in which foaming during processings is suppressed.

Yet, since such low toxic stabilizers alone cannot provide sufficient stabilizing effect, in order to improve the resistance to light, heat, oxidation and the like, a variety of additives such as organic phosphite compounds, epoxy compounds, phenolic antioxidants, benzophenone-based or benzotriazole-based ultraviolet absorbers and hindered amine-based light stabilizers are also used in combination.

RELATED ART DOCUMENTS

Patent Documents

Patent Document 1: Japanese Unexamined Patent Application Publication No. H11-323048

SUMMARY OF THE INVENTION

Problems to be Solved by the Invention

However, vinyl chloride resin compositions have a problem of so-called warm-water bleaching in that they become clouded when immersed in warm water and their transparency, which should be intrinsically maintained, is deteriorated. It is desired to solve this problem; however, known combinations of stabilizers do not sufficiently improve the resistance to warm-water bleaching. Particularly, those vinyl chloride resins that are used in rigid applications where no or almost no plasticizer is used have a problem in the resistance to warm-water bleaching.

Meanwhile, Patent Document 1 does not offer any description with regard to combinatory use of a zinc hydrotalcite compound and a specific processing aid and an improvement in the resistance to warm-water bleaching.

Therefore, an object of the present invention is to provide a vinyl chloride resin composition having an improved resistance to warm-water bleaching.

Means for Solving the Problems

The present inventors intensively studied in order to solve the above-described problems and discovered that the problems can be solved by using a zinc-modified hydrotalcite and a specific acrylic processing aid in combination, thereby completing the present invention.

That is, the vinyl chloride resin composition according to the present invention is characterized by comprising, with respect to 100 parts by mass of a vinyl chloride-based resin, 0.01 to 10 parts by mass of (a) a zinc-modified hydrotalcite and 0.01 to 10 parts by mass of (b) an acrylic processing aid having a weight-average molecular weight of 200,000 to 7,000,000.

In the vinyl chloride resin composition according to the present invention, it is preferred that the above-described (a) zinc-modified hydrotalcite be a compound represented by the following Formula (I):

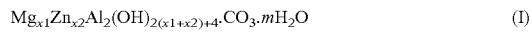

$$Mg_{x1}Zn_{x2}Al_2(OH)_{2(x1+x2)+4} \cdot CO_3 \cdot mH_2O \quad (I)$$

(wherein, x1 and x2 each represent a number satisfying the conditions of the following equations; and m represents a real number: $0.1 \leq x2/x1 < 10$, $2 \leq x1+x2 < 20$).

Further, in the vinyl chloride resin composition according to the present invention, it is preferred that the above-described (a) zinc-modified hydrotalcite have a refractive index of 1.52 to 1.56.

Further, in the vinyl chloride resin composition according to the present invention, it is preferred that the above-described (b) acrylic processing aid have a weight-average molecular weight of 200,000 to 2,000,000.

Further, it is preferred that the vinyl chloride resin composition according to the present invention comprise 0 to 10 parts by mass of a plasticizer component with respect to 100 parts by mass of the above-described vinyl chloride-based resin.

Effects of the Invention

The vinyl chloride resin composition according to the present invention has excellent resistance to warm-water bleaching and, therefore, can be suitably used in those applications of films, bottles, trays, plates, packagings, pipes, sheets and the like.

MODE FOR CARRYING OUT THE INVENTION

The vinyl chloride resin composition according to the present invention will now be described in detail. The vinyl chloride resin composition according to the present invention is characterized by comprising, with respect to 100 parts by mass of a vinyl chloride-based resin, 0.01 to 10 parts by mass of (a) a zinc-modified hydrotalcite and 0.01 to 10 parts by mass of (b) an acrylic processing aid having a weight-average molecular weight of 200,000 to 7,000,000.

The vinyl chloride-based resin used in the present invention is not particularly restricted to those that are produced by bulk polymerization, solution polymerization, suspension polymerization, emulsion polymerization or the like. Examples of the vinyl chloride-based resin used in the present invention include vinyl chloride-based resins such as polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride ternary copolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate ternary copolymers, vinyl chloride-maleic acid ester copolymers, vinyl chloride-methacrylic acid ester copolymers, vinyl chloride-acrylonitrile copolymers and copolymers of vinyl chloride and various vinyl ethers; blend products of these resins with each other; and blend products, block copolymers, graft copolymers and the like that are formed by these resins with other chlorine-free synthetic resins, such as acrylonitrile-styrene copolymers, acrylonitrile-butadiene-styrene copolymers, ethylene-vinyl acetate copolymers, ethylene-ethyl(meth)acrylate copolymers and polyesters.

The zinc-modified hydrotalcite used in the present invention as the component (a) is a carbonic acid complex salt compound of magnesium, zinc and aluminum, preferably a compound represented by the following Formula (I). Further, a zinc-modified hydrotalcite having a refractive index of 1.52 to 1.56 is preferred since a vinyl chloride resin composition having excellent transparency can be obtained. Here, the refractive index can be measured in accordance with JIS K0062.

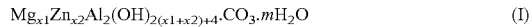

$$Mg_{x1}Zn_{x2}Al_2(OH)_{2(x1+x2)+4}\cdot CO_3\cdot mH_2O \qquad (I)$$

(wherein, x1 and x2 each represent a number satisfying the conditions of the following equations; and m represents a real number: $0.1 \leq x2/x1 < 10$, $2 \leq x1+x2 < 20$).

Further, the surface of the above-described zinc-modified hydrotalcite may also be coated with, for example, a higher fatty acid such as stearic acid, a higher fatty acid metal salt such as alkali metal oleate, an organic sulfonic acid metal salt such as alkali metal dodecylbenzene sulfonate, a higher fatty acid amide, a higher fatty acid ester or a wax.

The above-described zinc-modified hydrotalcite is added in an amount of 0.01 to 10 parts by mass, preferably 0.01 to 5 parts by mass, more preferably 0.05 to 3 parts by mass, with respect to 100 parts by mass of the vinyl chloride-based resin.

The acrylic processing aid used in the present invention as the component (b) is a polymer or a copolymer composed of an acrylic acid and an ester thereof and/or a methacrylic acid and an ester thereof. By adding such an acrylic processing aid to a resin such as vinyl chloride-based resin, the moldability and processability of the resin are improved, so that the productivity of the resulting resin molded article can be improved. The acrylic processing aid according to the present invention has a weight-average molecular weight of 200,000 to 7,000,000 and, from the standpoint of reducing foam formation in the resulting molded article, preferably 200,000 to 2,000,000.

Examples of the above-described ester of an acrylic acid include methyl acrylate, ethyl acrylate, n-butyl acrylate, isobutyl acrylate, 2-ethylhexyl acrylate and cyclohexyl acrylate. Examples of the above-described ester of a methacrylic acid include methyl methacrylate, ethyl methacrylate, n-butyl methacrylate, isobutyl methacrylate, 2-ethylhexyl methacrylate and cyclohexyl methacrylate. Thereamong, methyl methacrylate and butyl methacrylate are preferred. The acrylic processing aid may be a polymer only one of the above-described acrylic acids and esters thereof and methacrylic acids and esters thereof. Alternatively, the acrylic processing aid may be a copolymer of two or more of the above-described acrylic acids and esters thereof and methacrylic acids and esters thereof. Examples of commercially available products of the above-described acrylic processing aid include METABLEN P-type manufactured by Mitsubishi Rayon Co., Ltd.; KANE ACE PA Series manufactured by Kanegafuchi Chemical Industry Co., Ltd. (Kaneka Corporation); and PARALOID K Series manufactured by Rohm and Haas. Particularly, specific examples of the acrylic processing aid having a weight-average molecular weight of 200,000 to 2,000,000 include METABLEN P-570A and METABLEN P-551A, both of which are manufactured by Mitsubishi Rayon Co., Ltd.; and KANE ACE PA-10 manufactured by Kanegafuchi Chemical Industry Co., Ltd. (Kaneka Corporation). These acrylic processing aids having a weight-average molecular weight of 200,000 to 2,000,000 are preferably used in a vinyl chloride resin since a molded article having limited amount of foaming and excellent resistance to coloration can be obtained.

The above-described acrylic processing aid is added in an amount of 0.01 to 10 parts by mass, preferably 0.05 to 5 parts by mass, with respect to 100 parts by mass of the vinyl chloride-based resin.

Further, to the vinyl chloride resin composition according to the present invention, other additive(s) normally used in a vinyl chloride resin composition may be added, and examples of such additives include plasticizers; organic acid metal salts; zeolite compounds; β-diketone compounds; perchlorates; epoxy compounds; polyhydric alcohols; phosphorus-based, phenolic and sulfur-based antioxidants; ultraviolet absorbers; light stabilizers such as hindered amine-based light stabilizers; fillers; and lubricants.

Examples of the above-described plasticizers include phthalate-based plasticizers such as dibutyl phthalate, butylhexyl phthalate, diheptyl phthalate, dioctyl phthalate, diisononyl phthalate, diisodecyl phthalate, dilauryl phthalate, dicyclohexyl phthalate and dioctyl terephthalate; adipate-based plasticizers such as dioctyl adipate, diisononyl adipate, diisodecyl adipate and di(butyldiglycol)adipate; phosphate-based plasticizers such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate and octyldiphenyl phosphate; polyester-based plasticizers obtained by using ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, neopentyl glycol or the like as a polyhydric alcohol, and oxalic acid, malonic acid, succinic acid, glutaric acid, adipic acid, pimelic acid, suberic acid, azelaic acid, sebacic acid, phthalic acid, isophthalic acid, terephthalic acid or the like as a dibasic acid, in which polyester-based plasticizers a monohydric alcohol or a monocarboxylic acid is used as a stopper as required; tetrahydrophthalic acid-based plasticizers; azelaic acid-based plasticizers; sebacic acid-based plasticizers; stearic acid-based plasticizers; citric acid-based plasticizers; trimellitic acid-based plasticizers; pyromellitic acid-based plasticizers; biphenyl tetracarboxylic acid ester-based plasticizers; and chlorine-based plasticizers.

The amount of the above-described plasticizer to be used is adjusted as appropriate in accordance with the purpose thereof; however, a so-called rigid vinyl chloride resin composition which contains the plasticizer in an amount of 0 to 10 parts by mass with respect to 100 parts by mass of a vinyl chloride resin is preferred since the effects of the present invention is exerted more prominently.

Examples of the above-described organic acid metal salts include metal salts (such as sodium, potassium, calcium, barium, aluminum and zinc salts) of organic carboxylic acids, phenols and organic phosphoric acids.

Examples of the above-described organic carboxylic acids include monocarboxylic acids such as acetic acid, propionic acid, butyric acid, valeric acid, caproic acid, enanthic acid, caprylic acid, pelargonic acid, 2-ethylhexanoic acid, neodecanoic acid, capric acid, undecanoic acid, lauric acid, tridecanoic acid, myristic acid, palmitic acid, isostearic acid, stearic acid, 12-hydroxystearic acid, behenic acid, montanoic acid, benzoic acid, monochlorobenzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, cuminic acid, n-propylbenzoic acid, aminobenzoic acid, N,N-dimethylaminobenzoic acid, acetoxybenzoic acid, salicylic acid, p-tert-octylsalicylic acid, elaidic acid, oleic acid, linoleic acid, linolenic acid, thioglycolic acid, mercaptopropionic acid and octyl mercaptopropionic acid; dicarboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, hydroxyphthalic acid, chlorophthalic acid, aminophthalic acid, maleic acid, fumaric acid, citraconic acid, methaconic acid, itaconic acid, aconitic acid and thiodipropionic acid, and monoesters or monoamide compounds of these dicarboxylic acids; and tri- or tetra-carboxylic acids such as butanetricarboxylic acid, butanetetracarboxylic acid, hemimellitic acid, trimellitic acid, mellophanic acid and pyromellitic acid, and di- or tri-ester compounds of these tri- or tetra-carboxylic acids.

Examples of the above-described phenols include tert-butylphenol, nonylphenol, dinonylphenol, cyclohexylphenol, phenylphenol, octylphenol, phenol, cresol, xylenol, n-butylphenol, isoamylphenol, ethylphenol, isopropylphenol, isooctylphenol, 2-ethylhexylphenol, tert-nonylphenol, decylphenol, tert-octylphenol, isohexylphenol, octadecylphenol, diisobutylphenol, methylpropylphenol, diamylphenol, methylisohexylphenol and methyl-tert-octyl phenol.

Further, examples of the above-described organic phosphoric acids include mono- or di-octyl phosphoric acid, mono- or di-dodecyl phosphoric acid, mono- or di-octadecyl phosphoric acid, mono- or di-(nonylphenyl)phosphoric acid, nonylphenyl phosphonate and stearyl phosphonate.

Further, the above-described metal salts of organic carboxylic acids, phenols and organic phosphoric acids may also be an acidic salt, a neutral salt, a basic salt or a perbasic complex obtained by partially or entirely neutralizing the base of a basic salt with carbonic acid.

The above-described zeolite compounds are aluminosilicates of an alkali or an alkaline earth metal which have a unique three-dimensional zeolite crystal structure, and representative examples thereof include A-type, X-type, Y-type and P-type zeolites, monodenite, analcite, sodalite-family aluminosilicates, clinoptilolite, erionite and chabazite. These zeolite compounds may be either a hydrate having crystal water (so-called zeolite water) or an anhydride in which the crystal water is removed. Further, zeolites having a particle size of 0.1 to 50 μm may be employed and those having a particle size of 0.5 to 10 μm are particularly preferred.

Examples of the above-described β-diketone compounds include dehydroacetic acid, dibenzoylmethane, palmitoylbenzoylmethane and stearoylbenzoylmethane, and metal salts of these compounds are also equally useful.

Examples of the above-described perchlorates include metal perchlorates, ammonium perchlorates, perchloric acid-treated hydrotalcites and perchloric acid-treated silicates.

Here, examples of the metals constituting the metal salts include lithium, sodium, potassium, calcium, magnesium, strontium, barium, zinc, cadmium, lead and aluminum. The above-described metal perchlorates may be an anhydride or a hydrate salt. Alternatively, the above-described metal perchlorates may be one which is dissolved in an alcohol-based or ester-based solvent such as butyl diglycol or butyl diglycol adipate, or may be a dehydrate thereof.

Examples of the above-described epoxy compounds include bisphenol-type and novolac-type epoxy resins, epoxidized soybean oils, epoxidized linseed oils, epoxidized tung oils, epoxidized fish oils, epoxidized beef tallow oils, epoxidized castor oils, epoxidized safflower oils, epoxidized tall oil fatty acid octyl, epoxidized linseed oil fatty acid butyl, methyl epoxystearate, butyl epoxystearate, 2-ethylhexyl epoxy stearate, stearyl epoxystearate, tris(epoxypropyl)isocyanurate, 3-(2-xenoxy)-1,2-epoxypropane, epoxidized polybutadiene, bisphenol-A diglycidyl ether, vinylcyclohexene diepoxide, dicyclopentadiene diepoxide, 3,4-epoxycyclohexyl-6-methylepoxycyclohexane carboxylate and bis(3,4-epoxycyclohexyl)adipate.

Examples of the above-described polyhydric alcohols include pentaerythritol, dipentaerythritol, sorbitol, mannitol, trimethylolpropane, ditrimethylolpropane, stearic acid partial esters of pentaerythritol or dipentaerythritol, bis(dipentaerythritol)adipate, glycerin, diglycerin and tris(2-hydroxyethyl)isocyanurate.

Examples of the above-described phosphorus-based antioxidants include triphenyl phosphite, tris(2,4-di-tert-butylphenyl)phosphite, tris(nonylphenyl)phosphite, tris(dinonylphenyl)phosphite, tris(mono-, di-mixed nonylphenyl) phosphite, bis(2-tert-butyl-4,6-dimethylphenyl).ethyl phosphite, diphenyl acid phosphite, 2,2'-methylenebis(4,6-di-tert-butylphenyl)octyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentyl glycol).1,4-cyclohexane dimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, tetra(C12-15 mixed alkyl)-4,4'-isopropylidene diphenylphosphite, bis[2,2'-methylenebis(4,6-diamylphenyl)].isopropylidene diphenylphosphite, hydrogenated-4,4'-isopropylidene diphenol polyphosphite, tetra(tridecyl).4,4'-butylidenebis(2-tert-butyl-5-methylphenoediphosphite, hexa(tridecyl).1,1,3-tris(2-methyl-5-tert-butyl-4-hydroxyphenyl)butane.triphosphonite, 9,10-dihydro-9-oxa-10-phosphaphenanthrene-10-oxide and 2-butyl-2-ethylpropanediol-2,4,6-tri-tert-butylphenol monophosphite.

Examples of the above-described phenolic antioxidants include 2,6-di-tert-butyl-p-cresol, 2,6-diphenyl-4-octadecyloxyphenol, stearyl(3,5-di-tert-butyl-4-hydroxyphenyl)-propionate, distearyl(3,5-di-tert-butyl-4-hydroxybenzyl)phosphonate, thiodiethylene glycol-bis[(3,5-di-tert-butyl-4-hydroxyphenyl)propionate], 1,6-hexamethylenebis[(3,5-di-tert-butyl-4-hydroxyphenyepropionate], 1,6-hexamethylenebis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), bis[3,3-bis(4-hydroxy-3-tert-butylphenyl)butylic acid]glycol ester, 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyeisocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl)propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl)propionyloxy}ethyl]-2,4,8,10-tetraoxaspiro[5.5]undecane and triethylene glycol-bis[(3-tert-butyl-4-hydroxy-5-methylphenyl)propionate].

Examples of the above-described sulfur-based antioxidants include dialkyl thiodipropionates such as dilauryl, dimyristyl and distearyl thiodipropionates; and β-alkylmercapto propionic acid esters of polyols such as pentaerythritol tetra(β-dodecylmercaptopropionate).

Examples of the above-described ultraviolet absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl)benzotriazoles such as 2-(2'-hydroxy-5'-methylphenyl)benzotriazole, 2-(2'-hydroxy-3',5'-di-tert-butylphenyl)-5-benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole and 2,2'-methylenebis(4-tert-octyl-6-benzotriazolyl)phenol; benzoates such as phenyl salicylate, resorcinol monobenzoate, 2,4-di-tert-butylphenyl-3',5'-di-tert-butyl-4'-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenyl acrylate and methyl-2-cyano-3-methyl-3-(p-methoxyphenyl)acrylate.

Examples of the above-described hindered amine-based light stabilizers include 2,2,6,6-tetramethyl-4-piperidyl stearate, 1,2,2,6,6-pentamethyl-4-piperidyl stearate, 2,2,6,6-tetramethyl-4-piperidylbenzoate, N-(2,2,6,6-tetramethyl-4-piperidyl)dodecyl succinimide, 1-[(3,5-di-tert-butyl-4-hydroxyphenyl)propionyloxyethyl]-2,2,6,6-tetramethyl-4-piperidyl-(3,5-di-tert-butyl-4-hydroxyphenyl)propionate, bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-butyl-2-(3,5-di-tert-butyl-4-hydroxybenzyl)malonate, N,N'-bis(2,2,6,6-tetramethyl-4-piperidyl)hexamethylenediamine, tetra(2,2,6,6-tetramethyl-4-piperidyl)butane tetracarboxylate, tetra(1,2,2,6,6-pentamethyl-4-piperidyl)butane tetracarboxylate, bis(2,2,6,6-tetramethyl-4-piperidyl).di(tridecyl)butane tetracarboxylate, bis(1,2,2,6,6-pentamethyl-4-piperidyl).di(tridecyl)butane tetracarboxylate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane, 1,5,8,12-tetrakis[4,6-bis{N-(2,2,6,6-tetramethyl-4-piperidyl)butylamino}-1,3,5-triazine-2-yl]-1,5,8,12-tetraazadodecane, 1-(2-hydroxyethyl)-2,2,6,6-tetramethyl-4-piperidinol/dimethyl succinate condensate, 2-tert-octylamino-4,6-dichloro-s-triazine/N,N'-bis(2,2,6,6-tetramethyl-4-piperidyl)hexamethylenediamine condensate and N,N'-bis(2,2,6,6-tetramethyl-4-piperidyl)hexamethylenediamine/dibromoethane condensate.

Examples of the above-described fillers include calcium carbonate, silica, clay, glass beads, mica, sericite, glass flakes, asbestos, wollastonite, potassium titanate, PMF, gypsum fibers, xonotlite, MOS, phosphate fibers, glass fibers, carbon fibers and aramid fibers.

Examples of the above-described lubricants include hydrocarbons such as natural paraffins and low-molecular-weight polyethylenes; fatty acids such as stearic acid, lauric acid and erucic acid; aliphatic alcohols such as cetyl alcohol and stearyl alcohol; fatty acid amides such as stearic acid amide and methylenebis stearamide; lower alcohol esters of fatty acids such as butyl stearate; and higher alcohol esters of higher fatty acids such as glycerol monostearate.

In addition, in the vinyl chloride resin composition according to the present invention, an additive(s) normally used in a vinyl chloride-based resin, such as a cross-linking agent, an antistatic agent, an anti-clouding agent, an anti-plate-out agent, a surface treatment agent, a flame retardant, a fluorescent agent, an antifungal agent, a sterilizer, a metal inactivator, a mold release agent and/or a processing aid, may also be blended as required.

Further, the vinyl chloride resin composition according to the present invention can be processed by a conventionally known processing method for vinyl chloride-based resins. For example, the vinyl chloride resin composition according to the present invention can be suitably processed and molded by calendering, roll processing, extrusion molding, melt-rolling, injection molding, press molding, paste processing, powder molding or foam molding.

The vinyl chloride resin composition according to the present invention can be suitably used in those applications of films, bottles, trays, plates, packagings, pipes, sheets and the like. In addition, the vinyl chloride resin composition according to the present invention can also be used in building materials such as wall materials, floor materials, window frames, corrugated panels and rain gutters; automotive interior and exterior materials; fish and food packaging materials; and miscellaneous goods such as packings, gaskets, hoses, pipes, joints and toys.

EXAMPLES

The present invention will now be described in more detail by way of examples thereof; however, the present invention is not restricted to the following examples.

Examples 1-1 to 1-4 and Comparative Examples 1-1 to 1-3

The compositions shown in the Formulation Example 1 below were blended using a 10-L Henschel mixer and a sheet sample was prepared from the resultant using a biaxial extrusion molding machine (cylinder 1: 160° C., cylinder 2: 170° C., cylinder 3: 180° C., die: 190° C., screw speed: 15 rpm).

(Transparency)

The thus obtained sheet sample was pressed at 190° C. for 5 minutes to prepare a 0.5 mm-thick press plate and the haze value (transparency) thereof was measured using a haze meter.

(Resistance to Warm-Water Bleaching)

The thus obtained press plate was immersed in warm water of 85° C. for 30 minutes and then dried at room temperature for 3 days. Thereafter, the transparency of the resulting plate was measured again. The difference in the haze values before and after the immersion in warm water (ΔHaze) was calculated to evaluate the resistance to warm-water bleaching. The results thereof are shown in Table 1 below.

(Formulation Example 1)

| | parts by mass |
|---|---|
| Vinyl chloride resin (ZEST 1000Z manufactured by Shin Dai-ichi Vinyl Corporation, polymerization degree: 1,050) | 100 |
| Loxiol G-72 (lubricant manufactured by Emery Oleochemicals) | 0.5 |
| Tetrakis[methylene-3-(3,5-di-tert-butyl-4-hydroxyphenyl)propionate]methane | 0.1 |
| Zinc laurate | 0.3 |
| Stearoylbenzoylmethane | 0.5 |
| Test compound | shown in Table 1 |

TABLE 1

| | | Example | | | | Comparative Example | | |
|---|---|---|---|---|---|---|---|---|
| | | 1-1 | 1-2 | 1-3 | 1-4 | 1-1 | 1-2 | 1-3 |
| Test compound | ZHT*1 | 2.7 | 2.7 | 2.7 | 2.7 | 2.7 | 2.7 | — |
| | HT*2 | — | — | — | — | — | — | 2.7 |
| | Processing aid 1*3 | 5.0 | — | — | — | — | — | 5.0 |
| | Processing aid 2*4 | — | 5.0 | — | — | — | — | — |
| | Processing aid 3*5 | — | — | 5.0 | — | — | — | — |
| | Processing aid 4*6 | — | — | — | 5.0 | — | — | — |
| | Processing aid 5*7 | — | — | — | — | — | 5.0 | — |
| Evaluation Results | Transparency | 1.8 | 2.6 | 2.3 | 1.8 | 4.3 | 2.3 | 12.1 |
| | ΔHaze (0.5 mm) | 7.9 | 7.3 | 9.5 | 11 | 15. | 17.7 | 15.3 |

*1 zinc-modified hydrotalcite (composition formula: $Mg_{3.5}Zn_1Al_2(OH)_{12} \cdot CO_3 \cdot 3H_2O$), refractive index: 1.54
*2 hydrotalcite (composition formula: $Mg_{4.5}Al_2(OH)_{12} \cdot CO_3 \cdot 3H_2O$), refractive index: 1.50
*3 METABLEN P-570A (manufactured by Mitsubishi Rayon Co., Ltd., weight-average molecular weight: 260,000)
*4 METABLEN P-551A (manufactured by Mitsubishi Rayon Co., Ltd., weight-average molecular weight: 1,460,000)
*5 KANE ACE PA-40 (manufactured by Kaneka Corporation, weight-average molecular weight: 5,000,000)
*6 PARALOID K-130 (manufactured by Rohm and Haas, weight-average molecular weight: 3,100,000)
*7 KANE ACE PA-60 (manufactured by Kaneka Corporation, weight-average molecular weight: 8,000,000)

Examples 2-1 to 2-8 and Comparative Examples 2-1 and 2-2

The compositions shown in the Formulation Example 2 below were blended using a 10-L Henschel mixer and a sheet sample was prepared from the resultant using a biaxial extrusion molding machine (cylinder 1: 160° C., cylinder 2: 170° C., cylinder 3: 180° C., die: 190° C., screw speed: 15 rpm).

(Initial Coloration)

The yellowness (Y.I.) of the thus obtained sheet sample was measured using a differential colorimeter (TC-8600A; manufactured by Tokyo Denshoku Co., Ltd.).

(Gloss)

Further, the gloss value (gloss) of the sheet sample was measured using a gloss meter (measurement angle: 60°).

(Transparency)

Further, the sheet sample was pressed at 190° C. for 5 minutes to prepare a 1 mm-thick press plate and the transparency thereof was visually evaluated. The evaluation criteria were as follows: ⊚: very clear, ○: cloudiness was hardly observed, Δ: cloudiness was observed, and x: very cloudy.

(Foaming)

Further, the presence or absence of foaming in the press plate was visually evaluated.

(Extruder Load)

Further, based on the torque in the extrusion molding process, the load applied to the extruder was evaluated. With the load of the sample in which no processing aid was added (Comparative Example 2-1) being defined as "small", the loads applied by the respective samples were classified into "small" to "large". In addition, the amount of resin extruded from the die in a period of 1 minute at the time of extrusion molding (g/min) was measured.

The results thereof are shown in Table 2 below.

(Formulation Example 2)

| | parts by mass |
|---|---|
| Vinyl chloride resin (ZEST 1000Z manufactured by Shin Dai-chi Vinyl Corporation, polymerization degree: 1,050) | 100 |
| Epoxidized soybean oil | 1 |
| Distearyl pentaerythritol diphosphite | 0.25 |
| Tris(2-hydroxyethyl)isocyanurate | 0.5 |
| Tetrakis[methylene-3-(3,5-di-tert-butyl-4-hydroxyphenyl)propionate]methane | 0.1 |
| Zinc laurate | 0.3 |
| Stearoylbenzoylmethane | 0.5 |
| Loxiol G-60 (lubricant manufactured by Emery Oleochemicals) | 1.0 |
| Test compound | shown in Table 2 |

TABLE 2

| | | Example | | | | | | | | Comparative Example | |
|---|---|---|---|---|---|---|---|---|---|---|---|
| | | 2-1 | 2-2 | 2-3 | 2-4 | 2-5 | 2-6 | 2-7 | 2-8 | 2-1 | 2-2 |
| Test Compound | ZHT | 2.7 | 2.7 | 2.7 | 2.7 | 2.7 | 2.7 | 2.7 | 2.7 | 2.7 | — |
| | HT | — | — | — | — | — | — | — | — | — | 2.7 |
| | Processing aid 1*3 | 1.5 | 5.0 | — | — | — | — | — | — | — | — |
| | Processing aid 2*4 | — | — | 1.5 | 5.0 | — | — | — | — | — | 1.5 |
| | Processing aid 6*8 | — | — | — | — | 1.5 | 5.0 | — | — | — | — |
| | Processing aid 7*9 | — | — | — | — | — | — | 1.5 | 5.0 | — | — |
| Evaluation results | Initial Coloration | 26.0 | 28.3 | 27.6 | 28.3 | 28.7 | 28.4 | 33.5 | 34.0 | 32.1 | 29.1 |
| | Gloss (60°) | 107.9 | 115.8 | 115.8 | 104.7 | 117.4 | 107.9 | 118.1 | 96.4 | 72.4 | 109.8 |
| | Transparency | ⊚ | ⊚ | ⊚ | ⊚ | ⊚ | ⊚ | ⊚ | ⊚ | ○ | X |
| | Foaming | none | none | none | none | none | none | present | present | none | none |
| | Extruder load | small to medium | medium | small to medium | medium | small to medium | medium | large | large | small | small to medium |

TABLE 2-continued

|  | Example | | | | | | | | Comparative Example | |
|---|---|---|---|---|---|---|---|---|---|---|
|  | 2-1 | 2-2 | 2-3 | 2-4 | 2-5 | 2-6 | 2-7 | 2-8 | 2-1 | 2-2 |
| Extrusion amount (g/min) | 91.0 | 89.1 | 89.0 | 86.3 | 87.9 | 87.1 | 89.7 | 85.5 | 86.5 | 88.7 |

*[3]METABLEN P-570A (manufactured by Mitsubishi Rayon Co., Ltd., weight-average molecular weight: 260,000)
*[4]METABLEN P-551A (manufactured by Mitsubishi Rayon Co., Ltd., weight-average molecular weight: 1,460,000)
*[8]KANE ACE PA-10 (manufactured by Kaneka Corporation, weight-average molecular weight: 800,000)
*[9]METABLEN P-530A (manufactured by Mitsubishi Rayon Co., Ltd., weight-average molecular weight: 3,100,000)

As clearly seen from the above-described Examples, by using a zinc-modified hydrotalcite in combination with an acrylic processing aid having a weight-average molecular weight of 200,000 to 7,000,000, resin compositions having excellent transparency and resistance to warm-water bleaching were obtained. In particular, by using an acrylic processing aid having a weight-average molecular weight of 200,000 to 2,000,000 in combination, not only excellent initial coloration and gloss can be attained, but also foam formation during processings can be reduced and the extrusion productivity can be improved.

The invention claimed is:

1. A vinyl chloride resin composition, comprising, with respect to 100 parts by mass of a vinyl chloride-based resin,
    0.05 to 3 parts by mass of (a) a zinc-modified hydrotalcite and
    0.01 to 10 parts by mass of (b) an acrylic processing aid having a weight-average molecular weight of 200,000 to 2,000,000;
    wherein said (a) zinc-modified hydrotalcite is a compound represented by the following Formula:

$$Mg_{3.5}Zn_1Al_2(OH)_{12} \cdot CO_3 \cdot 3H_2O.$$

2. The vinyl chloride resin composition according to claim 1, wherein said (a) zinc-modified hydrotalcite has a refractive index of 1.52 to 1.56.

3. The vinyl chloride resin composition according to claim 1, which comprises a plasticizer component in an amount of 0 to 10 parts by mass with respect to 100 parts by mass of said vinyl chloride-based resin.

* * * * *